United States Patent [19]

Burnett et al.

[11] 4,350,653
[45] Sep. 21, 1982

[54] METHOD FOR THE EXTRUSION OF TETRAFLUOROETHYLENE POLYMER TUBES

[75] Inventors: Edward L. Burnett; Eugene V. Stack, both of Bay City, Mich.

[73] Assignee: The Dow Chemical Company, Midland, Mich.

[21] Appl. No.: 227,840

[22] Filed: Jan. 23, 1981

[51] Int. Cl.³ .............................................. B01J 2/06
[52] U.S. Cl. .................................................. 264/127
[58] Field of Search .......................................... 264/127

[56] References Cited

U.S. PATENT DOCUMENTS

| | | | |
|---|---|---|---|
| 2,456,621 | 12/1948 | Cheney, Jr. | 264/174 |
| 2,685,707 | 8/1954 | Llewellyn et al. | 264/174 |
| 2,847,711 | 8/1958 | Hibbard | 264/345 |
| 2,945,265 | 7/1960 | Sell, Jr. et al. | 264/176 P |
| 3,045,288 | 7/1962 | Sykara | 264/346 |
| 3,068,513 | 12/1962 | Chaffin | 264/176 R |
| 4,104,394 | 8/1978 | Okita | 264/127 |
| 4,203,938 | 5/1980 | Burnett et al. | 264/127 |

*Primary Examiner*—James R. Hall
*Attorney, Agent, or Firm*—R. B. Ingraham

[57] ABSTRACT

Tetrafluoroethylene polymer tubes are ram extruded. Desirable quality tubes are obtained by controlling the back pressure on the mandrel as the ram forces polymer to be fabricated into the barrel of the extruder.

3 Claims, 2 Drawing Figures

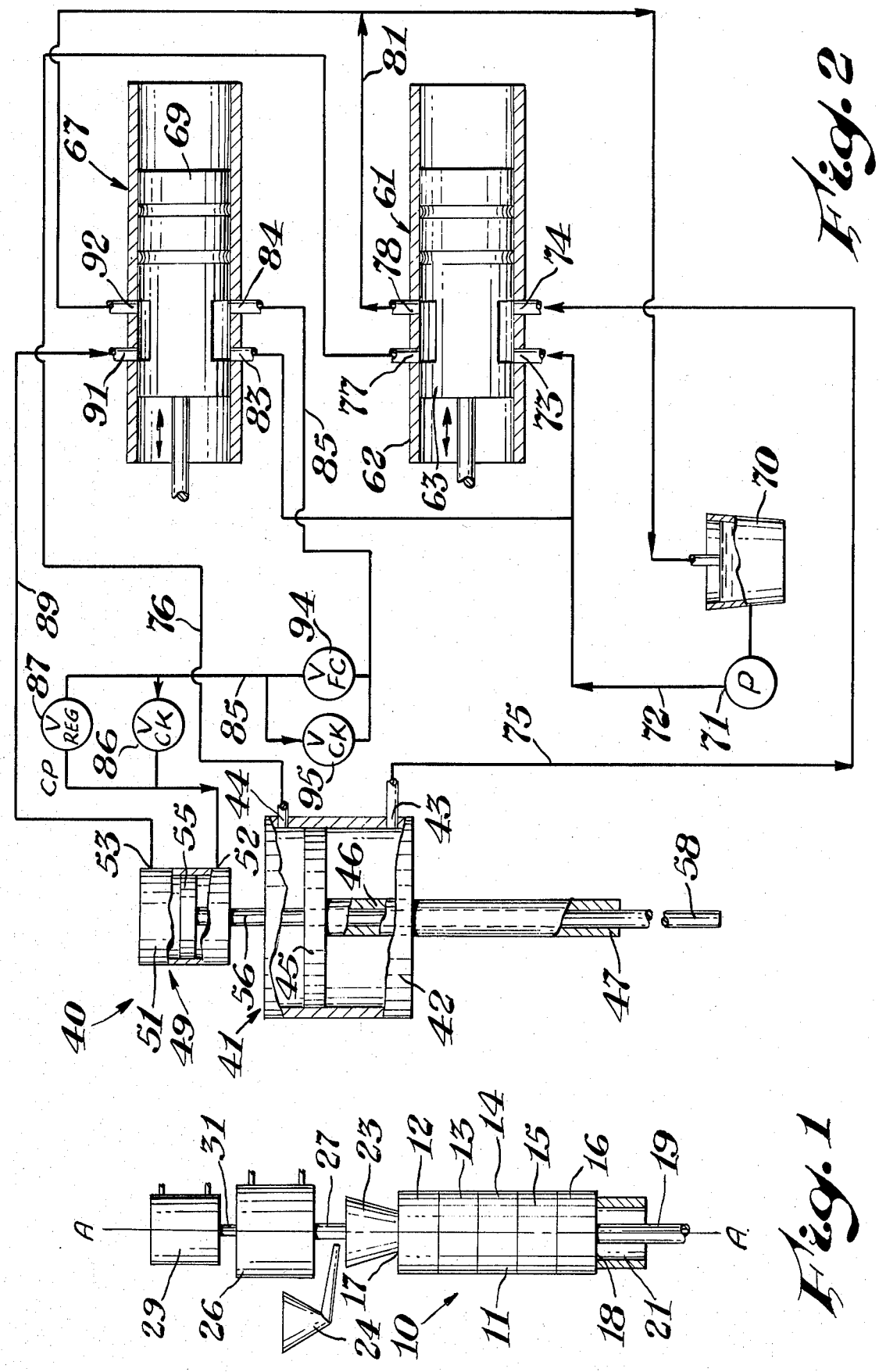

METHOD FOR THE EXTRUSION OF TETRAFLUOROETHYLENE POLYMER TUBES

Plastic lined pipe has found wide use in industry for applications where corrosion of conventional metallic pipes and conduit is undesirable. Plastic lined pipe or conduit provides a desirable combination of properties wherein the piping has the mechanical properties of the outer steel or other metal jacket and the desirable chemical resistance of the plastic liner. Plastic lined pipe does not provide a universal solution to all problems. Generally, lined pipe is less resistant to temperature cycling than is an all metal conduit. With plastic lined pipe, it has been known that liners have failed after temperature cycling, and cold flow of the liner can occur when flanged joints are employed. Oftentimes, plastic lined conduit is subject to corrosion due to the permeation of gases having a corrosive nature through the plastic liner. Generally, such plastic lined conduits vent the region between the liner and the supporting metallic conduit to space exterior to the conduit to prevent collapse of the liner due to the accumulation of gases which have permeated through the liner toward the interior wall of the supporting metallic conduit. By the judicious selection of appropriate plastic liner material and operating conditions, such difficulties are minimized.

A particularly desirable plastic lining for plastic lined conduit for extremes in both temperature and the corrosive nature of the material being handled are tetrafluoroethylene polymers such as polytetrafluoroethylene. Polytetrafluoroethylene, although softened by heating, is not readily fabricated by conventional thermoplastic process techniques but conventionally is fabricated using the processing techniques generally resembling the techniques employed for the preparation of sintered metal articles. Oftentimes, particularly in the preparation of tubular articles from tetrafluoroethylene polymer, such techniques result in articles having less than the desired physical properties. Various techniques are known for the preparation of tetrafluoroethylene polymer tubes. However, such techniques do not necessarily provide a tube having the desirable physical properties for the lining of metallic conduit. In general, for the lining of metallic conduit, the plastic tube such as a tetrafluoroethylene polymer tube should exhibit maximum density thereby providing a tube having minimal gas or vapor permeability. Such extruded tubes for optimum performance as a pipe or conduit liner should exhibit, on heating, minor shrinkage and preferably minor expansion in the radial direction and minimal shrinkage in the axial dimension. Shrinkage in the radial direction oftentimes results in a liner which will shrink within the lined conduit and, therefore, not be positively positioned within the conduit. In other words, the liner is loose. Generally, if the liner on temperature cycling exhibits a tendency to shrink in the axial direction and has integral flanges formed at the terminal portions of the liner, stress is generally concentrated at locations where the liner is flanged generally radially outward at either end of the conduit. Such stress can result in the phenomenon frequently referred to as stress cracking, that is rupture of the liner adjacent the terminal flange portions thereof which permits fluid being conveyed by the conduit ready access to the metallic outer jacket or conduit frequently referred to as failure.

A wide variety of techniques have been employed in the fabrication of tetrafluoroethylene polymers. One such method is set forth in our U.S. Pat. No. 4,203,938, issued May 20, 1980, wherein a polytetrafluoroethylene preform is formed from compacted polytetrafluoroethylene over a mandrel and the preform removed from the mandrel and sintered to provide a tube suitable for conduit lining.

Other processes for the preparation of tetrafluoroethylene polymer bodies are disclosed in U.S. Pat. No. 2,456,621 (Cheney, Jr.) wherein particulate polytetrafluoroethylene is pre-baked at a temperature from about 300° to 500° C. and subsequently extruded in a ram extruder to provide rods, tubes or coated wire.

U.S. Pat. No. 2,685,707 (Llewellyn et al.) discloses the preparation of extruded polytetrafluoroethylene by admixing the tetrafluoroethylene polymer with about 5 to 50 weight percent of an organic liquid and subsequently sintering the preform obtained by extrusion.

U.S. Pat. No. 2,847,711 (Hibbard) discloses the fabrication of polytetrafluoroethylene by, in essence, compacting polytetrafluoroethylene powder into a preform, for example, by compression molding, subsequently heating the preform in a second mold to a temperature above about 620° F. (about 327° C.) to obtain a desired tetrafluoroethylene polymer article.

U.S. Pat. No. 2,945,265 (Sell, Jr. et al.) discloses a method for the preparation of insulated wire wherein a ram extruder extrudes a mixture of tetrafluoroethylene polymer and a volatile organic material over a wire. The volatile organic material is removed by heating and the residual tetrafluoroethylene is sintered on the wire in a sintering oven.

U.S. Pat. No. 3,045,288 (Sykora) discloses that formed polytetrafluoroethylene articles may be annealed by maintaining the article just below a gel temperature of 617° F. (325° C.) for a period sufficiently long to stabilize the dimensional changes and subsequently cooling the article to room temperature.

U.S. Pat. No. 3,068,513 (Chaffin) discloses the ram extrusion of a polytetrafluoroethylene sheet wherein a plurality of temperature control zones are employed. Rod stock may also be employed using this technique.

U.S. Pat. No. 3,456,294 discloses a ram extruder which is suitable for the preparation of tetrafluoroethylene polymer tubes.

U.S. Pat. No. 4,104,394 (Okita) discloses a heat shrink polytetrafluoroethylene polymer tube prepared by extrusion. The tube is subsequently heated, inflated and cooled in the inflated condition.

In the publication "Research Disclosure" of January 1978, entry number 16508, it is disclosed that various fluorocarbon resins such as TEFLON FEP and PFA fluorocarbon resins may be extruded using relatively high temperatures at the die to result in decreased melt fracture. The term "TEFLON" is a trade designation for polytetrafluoroethylene. FEP is generally regarded as an abbreviation for fluorinated ethylene propylene copolymers and PFA is an abbreviation for perfluoroalkoxy polymers.

The problem of tube extrusion is described in great detail in the ICI Technical Service note F2, Third edition, concerning "FLUON" polytetrafluoroethylene by the Molding Powders Group ICI Plastics Division, Welwyn Garden City, Herts, England; published July 1974. The ICI publication, page 6 thereof, discloses that polytetrafluoroethylene desirably may be extruded in an extruder having four heating zones, each separately controlled and having temperatures of 370° C. (inlet), 400° C., 400° C. and 350° C. (outlet). A similar disclosure is set forth on pages 8, 9 and 11. A desirable arrangement of a ram extruder is set forth on page 19 wherein a generally downwardly extending ram tube extruder is disclosed and four heating zones are employed. On page 24, Table 11, the publication sets forth that desirable extrusion temperature for 60 to 50 millimeter diameter tubing is 380° C., 400° C., 400° C. and 300° C., respectively, as the extrusion progresses.

We have previously discovered that tetrafluoroethylene polymer tubes such as polytetrafluoroethylene tubes of significantly improved physical properties are obtained when tetrafluoroethylene polymer is extruded from a ram extruder at a temperature above its crystalline melting point and the temperature of the extrude reduced in a heating chamber to a temperature below the crystalline melting point in the absence of axial stress on the extruded tube. Such an extrusion is advantageously accomplished by extruding the tube downwardly and supporting the free end of the extruded tube by means of a variable counterbalance, the counterbalance increasing in weight as the tube is extruded downwardly. This is readily accomplished by employing as a variable counterweight a chain having approximately the same weight per unit of length as the weight of the extruded tetrafluoroethylene polymer tube.

In the preparation of polytetrafluoroethylene polymer tubes, for many applications it is permissible that the physical properties of such tubes may be less than the ultimate physical properties which are obtainable with a particular tetrafluoroethylene polymer resin. The extrusion of tetrafluoroethylene polymer resins into tubes of optimum or preferably ultimate physical properties such as tensile strength, maximum elongation, maximum resistance to permeation by various gases is suspected of being more of an art than a science. For a particular lot of a tetrafluoroethylene polymer such as polytetrafluoroethylene, for each extrusion apparatus conditions must be optimized to obtain the desired physical properties. Once one has optimized conditions for a particular extrusion apparatus and for a particular batch or lot of tetrafluoroethylene resin, frequently one finds that conditions must be changed to employ a different lot of what is supposedly marketed as the same resin or polymer, and indeed if one changes brands, that is employs resin or polymer from different manufacturers, one must again optimize conditions for extrusion to obtain desired and advantageous physical properties, in a tetrafluoroethylene polymer tube which is suitable for pipe lining. The individual nature of extruders and the individual nature of brands and lots of extrudable material is well known and appreciated by those who are skilled in the art of extrusion. The teaching of the hereinbefore cited U.S. Patents is herewith incorporated by reference thereto.

It would be desirable if there were available an improved method for the extrusion of tetrafluoroethylene polymers.

It would also be desirable if there were available an improved method for the extrusion of tetrafluoroethylene polymer tubes wherein optimum physical properties of the extruded tube were more readily achieved.

It would also be desirable if there were available an improved method for the extrusion of tetrafluoroethylene polymer tubes which would provide for the control of an additional variable in the extrusion process and allow more ready adjustment of the extrusion apparatus to provide tubes of desired physical property.

These benefits and other advantages are achieved in a method for the fabrication of tetrafluoroethylene polymer tubes wherein a tetrafluoroethylene polymer resin is ram extruded in a ram extruder to generally fuse together particles of the tetrafluoroethylene polymer resin to provide a coherent tetrafluoroethylene polymer tube discharging the coherent tetrafluoroethylene polymer tube from the ram extruder, the ram extruder having a hollow cylindrical barrel, the barrel having a resin entrance end and a resin exit end, a hollow cylindrical ram reciprocally movable to a location within and external to the entrance end of the barrel, a generally cylindrical mandrel disposed within and passing through the hollow cylindrical ram, the mandrel extending into the barrel and terminating generally adjacent the discharge end of the barrel, the ram being in operative association with means to reciprocally position the hollow cylindrical ram generally along an axis of the direction of extrusion of the barrel and means to reciprocally position the mandrel along the axis of extrusion of the barrel, the improvement which comprises means to continuously vary the force required to maintain the mandrel in a position generally remote from the discharge end of the barrel and to permit movement of the mandrel toward the discharge end of the barrel when a predetermined force of the ram provided by frictional engagement with the tetrafluoroethylene polymer resin has been exited.

Also disclosed for carrying out the present invention is an apparatus for the extrusion of tetrafluoroethylene polymer resin into tubular articles, the apparatus comprising a ram extruder, the ram extruder comprising a barrel of generally cylindrical hollow configuration means to heat the barrel, the barrel defining an internal generally cylindrical passage having an inlet end and an access of extrusion, a generally hollow cylindrical ram having an external diameter approximating the internal diameter of the hollow passageway within the barrel being slidably disposable therein means to reciprocate the hollow ram to a location within the barrel and a location external to the barrel, the location within the barrel and external to the barrel being generally disposed adjacent the inlet end of the barrel, a cylindrical mandrel extending into the hollow ram and into the barrel to a location generally adjacent the discharge end of the barrel means to reciprocally position the mandrel axially with respect to the axis of extrusion and an axis of generation of the hollow cylindrical ram; means to heat at least a portion of the barrel to a temperature sufficiently high to cause the tetrafluoroethylene polymer resin to reach a temperature above its crystalline melting point within the barrel and prior to discharge from the discharge end of the barrel the improvement which comprises providing means to continuously vary the force required to move the mandrel from a position generally remote from the discharge end of the barrel to a position closer to the discharge end of the barrel when frictional force is applied to the mandrel by tetrafluoroethylene polymer resin being extruded therein.

Further features and other advantages of the present invention will become more apparent from the following specification taken in connection with the drawing wherein:

FIG. 1 schematically depicts a vertically downwardly extruding ram extruder useful for the method of the invention.

FIG. 2 is a simplified schematic representation of the essential control and actuating elements for a ram extruder such as is depicted in FIG. 1.

In FIG. 1, there is schematically represented a vertically outwardly extruding ram extruder useful for the method of the present invention generally designated by the reference numeral 10. The extruder 10 comprises a hollow generally cylindrical barrel 11. The barrel 11 has a generally cylindrical extruder configuration and a generally cylindrical passageway disclosed therein not shown. The extruder barrel 11 schematically depicts a plurality of heating zones 12, 13, 14, 15 and 16 disposed along the length thereof. The barrel 11 has an axis of extrusion A. The barrel 11 has an inlet or feed end 17 and a discharge or exit end 18. The feed end 17 is upwardly disposed where the discharge end 18 is downwardly disposed. As depicted in FIG. 1, the hollow generally cylindrical tube 19 is discharged from the discharge end 18 of the barrel 11. Generally adjacent the discharge end 18 and remotely disposed from the inlet end 17 is a downwardly dependent heating chamber 21. A barrel feed hopper 23 is disposed generally adjacent the feed end 17 of the barrel 11 and is externally disposed thereto. The hopper 23 is of generally frustoconical and upwardly divergent configuration. A feed distributing means, not shown, is disposed within the hopper 23 to provide a generally uniform distribution of the feed material within the lowermost portion of the hopper 23, the lowermost portion being adjacent the inlet end 17. A polymer resin or metering hopper 24 is disposed generally above the hopper 23 and adapted to intermittently provide quantities of resin to the hopper 23. Above the hopper 23 is disposed a first linear actuating means designated by the numeral 26. The linear actuating means 26 has affixed thereto a hollow cylindrical ram 27. The ram 27 external to the linear actuating means 26 depends downwardly toward the inlet end 17 of the barrel 11. The linear actuating means 26 is adapted to reciprocally move the hollow cylindrical ram 27 along the axis of extrusion A which is also the axis of generation of the arm 27. Thus, the hollow ram 27 is coaxially positioned within the hollow cylindrical passage of the barrel 11. When the linear actuating means 26 moves the ram 27 upwardly, the terminal portion of the ram 27 remote from the linear actuating means 26 is disposed external to the barrel 11 and at a level above the inlet end 17 of the barrel 11. A mandrel actuating means 29 is generally coaxially disposed with relationship to the axis A of extrusion and the linear actuating means 26. The mandrel actuating means 29 has affixed thereto a mandrel 31. The mandrel 31 is of lesser diameter than the ram 27 and extends through the ram 27 into the barrel 11 and extends through the ram 27 into the barrel 11 and terminates at a region generally adjacent the discharge end 18 of the barrel 11. The ram 27 and the mandrel 31 by means of linear actuators 26 and 29 may be independently reciprocally positioned along the axis A.

In operation of the method using apparatus such as the apparatus 10 of FIG. 1, a resin or polymer to be extruded is intermittently supplied from hopper 24 to hopper 23 with the ram 27 in its upward position. The resin in the hopper 23 is distributed generally uniformly about the mandrel 31. The ram 27 is moved downwardly along the axis A to compact the resin in the hopper and force a portion thereof into the hollow cylindrical passage of the barrel 11. Depending upon the operating conditions desired, the linear actuator 29 may move downwardly with the movement of ram 27. The mandrel 31 may be positioned at its lowermost location prior to moving the ram 27 to its lowermost position, or the mandrel 31 in the practice of the present invention may be moved downwardly with the ram 27 only when a predetermined force is applied to the mandrel 31 due to the frictional engagement of the mandrel by the resin or polymer being extruded.

The operation of such a ram extruder is set forth in U.S. Pat. No. 3,456,294 as well as the Imperial Chemical Industries brochure hereinbefore set forth and incorporated by reference thereto.

In FIG. 2, there is schematically set forth linear actuator and control assembly suitable for the practice of the present invention and useful with a ram extruder such as schematically depicted in FIG. 1. The assembly is generally indicated by the reference numeral 40.

As depicted in FIG. 2, the control assembly comprises a first linear actuator 41. The linear actuator 41 as shown in FIG. 2 is a hydraulic cylinder 42. The cylinder 42 has a first actuating fluid port 43 and a second fluid port 44. The ports 43 and 44 are disposed toward the bottom and top of the cylinder 42 as illustrated in FIG. 2. Within the cylinder 42 is a piston 45. The piston 45 has affixed thereto a downwardly dependent cylindrical ram 46 having a terminal end 47 remotely disposed from the piston 45. The end 47 of the hollow cylindrical ram 46 is adapted to be positioned either within or without a feed end of an extruder barrel such as the end 17 of the barrel 11 of the extruder of FIG. 1. A second linear actuator 49 which advantageously is a hydraulic cylinder 51 is coaxially positioned relative to the cylinder 42 and is positioned above the cylinder 42. The hydraulic cylinder 51 has a lower actuating fluid port 52 and an upper actuating fluid port 53. Beneficially, the linear actuators 49 and 41 are each double acting hydraulic cylinders. The cylinder 51 has disposed therein a piston 55. The piston 55 has affixed thereto a mandrel 56 which is downwardly dependent and extends from piston 45 of cylinder 42 through ram 46 and terminates with mandrel end 58. Mandrel end 58 is disposed generally adjacent a discharge end such as discharge end 18 of barrel 11 of FIG. 1. In operative association with cylinder 42 is control valve 61. Control valve 61 is a 4-port two position valve having a valve housing 62 and a sliding valve member 63 which is positionable in the direction as generally indicated by the double ended arrow to selectively provide position of the piston 45 toward a location adjacent the hopper or alternatively the lower portion of cylinder 42. A similar valve 67 is in operative association with linear actuator 49 and on selective positioning of a valving element 69, the piston 55 is selectively positioned against the upper or lower portion of the cylinder 51. A hydraulic pump 71 is in operative combination with an actuating fluid or hydraulic oil sump 70. The pump 71 is attached to move hydraulic fluid or oil from the sump 70 in the direction indicated by the arrow associated with the pump 71. Pump 71 forwards fluid under pressure through line 72 to inlet port 73 of the valve 61 and as depicted in FIG. 2 connects port 73 with port 74 of valve 61, and port 74 of valve 61 conveys hydraulic fluid through line 75 to port 43 of cylinder 42 thereby forcing piston 45 upwardly discharging hydraulic fluid through line 76 to port 77 of valve 61 which is connected to port 78 of valve 61. Port 78 of valve 61 is in turn connected to sump 70 by means of line 81. When the valving member 68 is positioned to the left to provide an alternate position of the valve 61, port 73 is connected to port 77 which provides hydraulic fluid to port 44, forcing piston 45 to its lowermost position while hydraulic fluid is forced to flow from port 43 through line 75 into port 74 of valve 61. Port 74 is connected to port 78 which discharges hydraulic fluid into line 81. Line 81 in turn discharges into sump 70.

In general a similar system of control is employed for the positioning of the piston 55 of the mandrel linear actuator 49. A branch of line 72 provides hydraulic fluid to port 83 of valve 67, and the valve as depicted in FIG. 2 connects port 83 to port 84. Hydraulic fluid is discharged from port 84 into line 85. Line 85 has disposed therein a parallel check valve 86 and a constant pressure regulating valve 87. The check valve 86 permits flow in the line 85 toward port 52 of cylinder 51 and the regulating valve 87 maintains a constant pressure to the side of regulating valve 87 which is in direct communication with port 52 of cylinder 51. Thus the hydraulic fluid flowing from port 83 of valve 67 to port 84 of valve 67 into line 85 passes through check valve 86 and into port 52 of cylinder 51 moving piston 55 toward its uppermost position, forcing hydraulic fluid from port 53 of cylinder 51 through line 89 into port 91 of valve 67 and discharging the hydraulic fluid from port 92 into a branch of conduit or line 81 and discharging the hydraulic fluid into the sump 70. When valve 67 is in the opposite position, hydraulic fluid from conduit 72 passes into port 83 of valve 67 and is discharged from port 91, hydraulic fluid passes through line 89 into port 53 of cylinder 51 to urge piston 55 towards a lowermost position adjacent port 52. The force applied to piston 55 or to mandrel 58 by the frictional force of resin being extruded from a ram extruder such as extruder 10 of FIG. 1 causes pressure to increase on the hydraulic fluid adjacent port 52, cylinder 51 which is forced to flow through line 85 to adjustable pressure regulating valve 87 flow being prevented through check valve 86. The discharge from the regulating valve 87 flows through line 85 to port 84 of valve 67 and is discharged through line 81 to sump 70. Line 85 has disposed therein a flow volume control valve 94 and a check valve 95 in parallel with flow control valve 94. The check valves 86 and 94 are adapted to oppose flow in opposite directions.

The flow control valve 94 and its associated check valve 95 in parallel therewith provides a means of limiting the rate at which piston 55 is moved toward the upper portion of cylinder 51 and therefore essentially is rate controlling for the up stroke of mandrel 56. On the downward movement of the piston 55, rate is controlled primarily by the constant pressure regulating valve 87. Optionally port 53 of actuator 49 maybe vented to sump 70 and port 91 of valve 67 plugged.

In the conventional ram extrusion of tetrafluoroethylene polymers wherein a control system is used, somewhat similar to that schematically depicted in FIG. 2, one generally has a choice as the ram 46 is forced downwardly and into the extruder barrel of maintaining the mandrel 56 in a fixed position or permitting the mandrel 56 to move downwardly within the barrel at a rate equal to the rate of movement of the ram 46. To a reasonable approximation this represents a situation where the back pressure imposed on the ram 46 can be arbitrarily considered equal to one in the instance where the mandrel 56 moves into the cylinder at the same rate as does the ram 46. If the mandrel 56 is maintained stationary while the ram 46 forces additional polymer into the barrel, such as the barrel 11, the back pressure as seen by the ram 46 can arbitrarily be considered to be two. Thus, in the conventional operation of a ram extruder of a specific size operating under fixed conditions, one has a choice of back pressure applied to the ram 46 and subsequently to the tetrafluoroethylene polymer resin particles being compacted in the barrel of the extruder of a relative value of one or two. We have found that when employing a variety of tetrafluoroethylene polymers such as polytetrafluoroethylene, optimum properties of the extruded tube are not readily obtained when various batches of resin bearing the same trade designation but of different lot numbers are employed, and a greater variation is observed when supposedly similar resins of different manufacture are utilized. Each lot of resin of a particular manufacturer's designation appears to have an optimum back pressure in order to obtain optimum physical properties. It has generally been observed that when a back pressure is employed which is too low, insufficient compaction of the particulate resin is obtained and the resultant extruded tube tends to be porous, that is to have unduly high gas transmission rates and relatively low tensile strength, and oftentimes an undesirably low elongation. When back pressure in a ram extruder is excessive, that is above the optimum back pressure for a particular operating condition and a particular lot of a particular brand name of resin, a phenomonon occurs which for a matter of convenience has been referred to as poker chipping. The extruded tube exhibits a plurality of parallel circumferential bands which on casual observation give the impression of being rather sharp zones of slightly reduced diameter, although measurement of the tubes generally does not reveal any such reduced diameter. Exceptionally such zones appear to be regions of weakness and a principal point of fracture when the tube is subjected to tensile loading. When employing a control system such as is depicted in FIG. 2, the back pressure exerted by the ram 46 may readily be varied between the two extreme conditions the first of which has been arbitrarily assigned the value of one which represents the minimum back pressure; that is when the mandrel 56 and the ram 46 move together in the same direction into the barrel of the extruder; and the second situation where the friction value is twice that of the first condition, that is when the mandrel is maintained stationary and the ram 46 forced into the barrel of the extruder. By utilizing the combination of valves 86 and 87 wherein the back pressure provided by the valve 87 is continuously variable at least incrementally variable to provide controlled motion of the mandrel 56 as the ram 46 is moved into the barrel of the extruder. Employing a control such as has been depicted in FIG. 2 together with a ram extruder as schematically represented in FIG. 1, lot-to-lot variation in tetrafluoroethylene polymer resin and manufacturer-to-manufacturer variations in tetrafluoroethylene polymer resins have been much more readily accomplished than when employing control systems in accordance with the prior art wherein the combination of the valves 86 and 87 have been omitted, although the method of the present invention for convenience have been described in terms of a hydraulic control system. If desired, an electro-mechanical system can readily be substituted. However, for most extrusion operations, the hydraulic system is preferred.

For ease of illustration and understanding the invention much of the peripheral apparatus used in valving has been omitted, such arrangements being well known to those skilled in the art and need not be further dwelled upon.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the fabrication of a tetrafluoroethylene polymer tube wherein a tetrafluoroethylene polymer resin is ram extruded in a ram extruder to generally fuse together particles of the tetrafluoroethylene polymer resin to provide a coherent tetrafluoroethylene polymer tube discharging the coherent tetrafluoroethylene polymer tube from the ram extruder, the ram extruder having a hollow cylindrical barrel, the barrel having a resin entrance end and a resin exit end, a hollow cylindrical ram reciprocally movable to a location within and external to the entrance end of the barrel, a generally cylindrical mandrel disposed within and passing through the hollow cylindrical ram, the mandrel extending into the barrel and terminating generally adjacent the discharge end of the barrel, the ram being in operative association with means to reciprocally position the hollow cylindrical ram generally along an axis of the direction of extrusion of the barrel and means to reciprocally position the mandrel along the axis of extrusion of the barrel, the improvement which comprises means to continuously vary the force required to maintain the mandrel in a position generally remote from the discharge end of the barrel and to permit movement of the mandrel toward the discharge end of the barrel when a predetermined force of the ram provided by frictional engagement with the tetrafluoroethylene polymer resin has been reached.

2. The method of claim 1 wherein the ram and mandrel are hydraulically actuated.

3. The method of claim 2 wherein ram movement to a location within the barrel is limited by a pressure regulating valve in a discharge port of a hydraulic cylinder which actuates the mandrel.

* * * * *